United States Patent [19]

Nakagawa et al.

[11] Patent Number: 5,241,679
[45] Date of Patent: Aug. 31, 1993

[54] DATA PROCESSOR FOR EXECUTING DATA SAVING AND RESTORATION REGISTER AND DATA SAVING STACK WITH CORRESPONDING STACK STORAGE FOR EACH REGISTER

[75] Inventors: Tetsuya Nakagawa, Millbrae, Calif.; Masafumi Miyamoto, Koganei; Yasuhiro Sagesaka, Kodaira, both of Japan; Toru Baji, Burlingame, Calif.

[73] Assignee: Hitachi Ltd., Tokyo, Japan

[21] Appl. No.: 545,290

[22] Filed: Jun. 27, 1990

[30] Foreign Application Priority Data

Jul. 5, 1989 [JP] Japan .................. 1-171785

[51] Int. Cl.⁵ ............................................. G06F 13/00
[52] U.S. Cl. ................................. 395/725; 395/250; 395/425; 395/775; 395/375; 364/DIG. 1; 364/280.8; 364/230.2; 364/254.5; 364/263.2
[58] Field of Search ............... 395/725, 250, 425, 775, 395/375

[56] References Cited

U.S. PATENT DOCUMENTS

| | | | |
|---|---|---|---|
| 4,268,904 | 5/1981 | Suzuki et al. | 364/DIG. 1 |
| 4,740,893 | 4/1988 | Buchholz et al. | 364/DIG. 1 |
| 5,041,964 | 8/1991 | Cole et al. | 364/750 |
| 5,095,526 | 3/1992 | Baum | 395/725 |

FOREIGN PATENT DOCUMENTS 143583 11/1981 Japan .

OTHER PUBLICATIONS

Motorola MC 68020 User's Manual, Prentice-Hall Inc., 1984 Appendix B, pp. 110-112.

*Primary Examiner*—Lawrence E. Anderson
*Attorney, Agent, or Firm*—Fay, Sharpe, Beall, Fagan, Minnich & McKee

[57] ABSTRACT

A data processor comprises a plurality of registers 1 (registers $a$ to $d$), a plurality of data saving stack memory devices 2 coupled to the registers 1 for exclusive use thereof, respectively, and an instruction decoder for decoding instructions for controlling the registers 1 and the data saving stack memory devices 2 in accordance with the result of the instruction decoding. In response to an instruction "PUSH", the contents of the registers 1 (registers $a$ to $d$) are selectively saved to the data saving stack memory device 2. In response to a instruction "POP", the contents of the data saving stack memory devices 2 are selectively restored to the registers 1 (registers $a$ to $d$). Each of the instructions "PUSH" and "POP" has a field for indicating need or needlessness of the saving and restoration for each of the registers 1 and each of the data saving memories 2.

12 Claims, 4 Drawing Sheets

| PUSH SIGNAL | POP SIGNAL | OPERATION OF REGISTERS WITH STACKS |
|---|---|---|
| O | O | NO OPERATION |
| O | 1 | CONTENT OF STACK LEVEL $L_2$ —POP→ STACK OF LEVEL $L_1$<br>CONTENT OF STACK LEVEL $L_1$ —POP→ REGISTER |
| 1 | O | CONTENT OF REGISTER —PUSH→ STACK OF LEVEL $L_1$<br>CONTENT OF STACK LEVEL $L_1$ —PUSH→ STACK OF LEVEL $L_2$ |
| 1 | 1 | ———————— |

FIG. 4

DATA PROCESSOR FOR EXECUTING DATA SAVING AND RESTORATION REGISTER AND DATA SAVING STACK WITH CORRESPONDING STACK STORAGE FOR EACH REGISTER

BACKGROUND OF THE INVENTION

1 Field of the Invention

The present invention relates generally to a data processor operating with a program and more particularly to a data processor having a great number of registers incorporated therein.

2. Description of the Prior Art

As a first technique known heretofore which is relevant to the present invention, there can be mentioned a system disclosed in "Motorola MC68020 User's Manual", Prentice-Hall Inc., 1984 APPENDIX B, pp. 110-112.

In the hitherto known microprogram type data processor (or microcomputer) such as exemplified by the above-mentioned system, there are employed an instruction for saving all the contents of a plurality of registers provided internally of the data processor to an external memory device on one hand, and an instruction for restoring the contents of the external memory device to the plural registers incorporated in the data processor on the other hand.

When the instructions mentioned above are used, a program being executed has to be once interrupted temporarily for saving the contents of all the registers to the external memory device in order to execute another subroutine program. Thereafter, the contents of all the registers are restored from the external memory device, whereupon execution of the program being interrupted can be resumed.

As a second hitherto known technique relevant to the invention, there may be mentioned a buffer memory control system disclosed in JP-A-56-143583.

In the case of the buffer memory control system described in this publication, it is proposed to store stack information into a high-speed buffer memory provided internally of an arithmetic controller connected to a main memory device. More specifically, stack data are stored in the high-speed buffer memory in response to an instruction "CALL" which is executed upon transition from a main program to a subprogram, while the stack data are read out from the high-speed buffer memory in response to an instruction "RETURN" which is executed upon resuming the main program from the subprogram.

SUMMARY OF THE INVENTION

The first mentioned prior art data processor suffers from a problem that a lot of time is required in proportion to the number of the registers because the data of a plurality of registers designated by the instruction are sequentially transferred one by one to the external memory device via a single data bus. This problem becomes more serious particularly in the data processor which is equipped with a great number of exclusive purpose registers in an effort to realize a high-speed operation. Further, in the case of the data processor incorporating a great number of the exclusive purpose registers, the program is usually prepared by combining many subroutines, which in turn means that the number of times the contents of the registers are saved and restored is increased to make the problem more serious. Besides, when the program is prepared by using an assembly language, it is necessary to designate the names of all the registers to be subjected to the data transfer. Thus, a large number of the registers is attended with a corresponding increase in the amount of description for the program which will then become more difficult to understand, to another disadvantage.

The second mentioned prior art technique also suffers a similar problem. More specifically, since the stack data have to be sequentially transferred from the controller (including a plurality of general purpose registers) of the arithmetic controller unit to the high-speed buffer memory through the single data bus provided between the buffer memory and the controller, there arises the problem that the time taken for the data transfer increases in proportion to the number of the registers.

It is therefore an object of the present invention to solve the problems of the prior art systems mentioned above and provide a data processor which allows saving and restoration of the register contents to be performed at a high speed regardless of the number of the registers with a simplified program.

For achieving the above object, the data processor according to a typical embodiment of the present invention comprises a plurality of registers 1 (registers $a$ to $d$) and a plurality of data saving stack memory devices 2 coupled to the registers 1 (registers $a$ to $d$) for the exclusive use thereby, respectively, wherein the instruction executed by the data processor has a field on the instruction code, which field is dedicated to the control of operations of the stack memory devices 2 associated with the registers 1, respectively. In this conjunction, the stack control instruction may be of such assembler mnemonic as describing the register whose content is not to be transferred to the stack memory device 2.

In the data processor according to a typical embodiment of the invention, there are provided the dedicated data saving stack memory devices 2 coupled to the individual registers for the exclusive use thereof, wherein operation of these stack memory devices is controlled by the instruction.

Which such arrangement, it is rendered unnecessary to save the contents of the registers sequentially one by one to the external memory device or to the high-speed buffer memory. The contents of all the registers can be saved substantially simultaneously to the respective dedicated stack memories.

Conversely, the contents of all the dedicated stack memories 2 can be restored simultaneously to the associated registers 1, respectively. Since a field is provided on the instruction code for indicating the operation of the stack memories for the associated registers, it is also possible to specify a particular one of the registers for which neither data saving nor restoration is to be performed. By virtue of this feature, the transfer of reference value (argument) between a main routine and a subroutine can be accomplished with an improved efficiency. In view of the fact that the number of the registers used for the transfer of the argument or reference value is usually far smaller than the total number of the registers, the amount of description for the program can significantly be decreased by using the assembler mnemonic of designating the register for which neither saving nor restoration is to be performed.

These and other advantages and attainments of the present invention will become apparent to those skilled in the art upon a reading of the following detailed description when taken in conjunction with the drawings.

DESCRIPTION OF THE PREFERRED EMBODIMENTS

Now, the present invention will be described in greater details in conjunction with a preferred or exemplary embodiment by reference to FIGS. 1 to 4.

Figure 1:
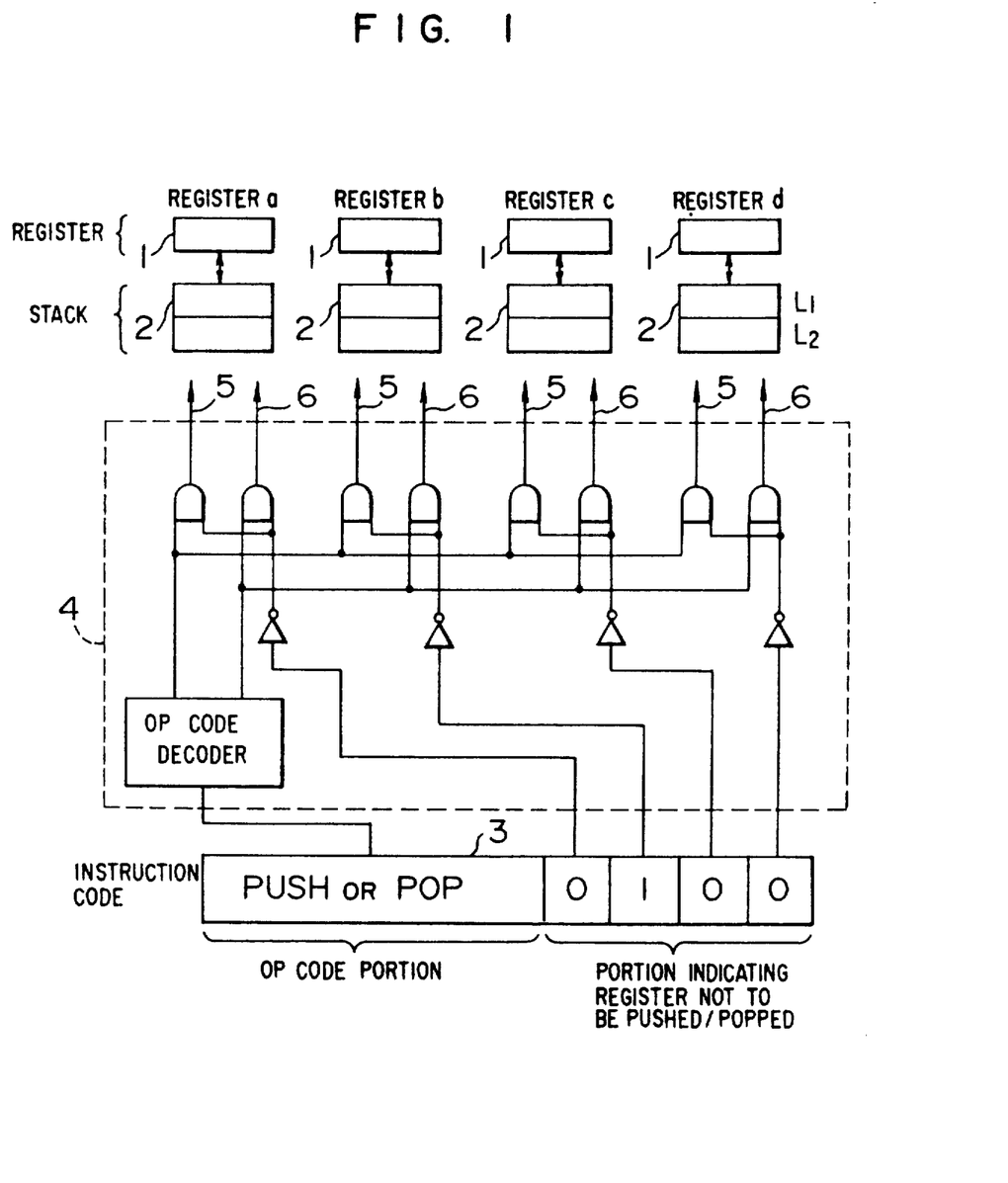
FIG. 1 is a diagram showing a general arrangement of a data processor according to an exemplary embodiment of the present invention.

FIG. 1 shows a basic structure of a data processor according to an exemplary embodiment of the invention. Although not shown in this figure, instructions read out from a memory device are decoded by an instruction decoder 4, wherein operation of an instruction executing part is controlled in accordance with the information resulting from the instruction decoding. Additionally, the results of the instruction decoded by the instruction decoder 4 are utilized for controlling data saving and restoring operations for a plurality of registers 1 and a plurality of data saving stack memories 2, as described below in detail.

In the following, it is assumed only for the purpose of simplifying the description that the data processor under consideration includes four registers generally denoted by a reference numeral 1 and individually designated by reference characters a, b, c and d and that each of the registers 1 (i.e. registers a, b, c, d) is provided with a stack memory having a depth of two stack levels. It should however be understood that the invention is never limited to the above-mentioned numbers of the registers 1 and the stack levels but can equally be applied to the data processor incorporating any given number of registers 1 each including the stack memory of any given number of depth or stack levels. Further, it is self-explanatory that the individual registers a to d and the stack memories 2 are mutually connected by coupling lines although not shown in detail.

The data processor according to the illustrated embodiment is thus constituted basically by four registers 1 (i.e. registers a to d), the stack memories 2 provided in association with the registers 1, respectively, and each having the depth of two levels and the instruction decoder 4.

For convenience of description, an instruction code 3 for the instruction to be executed by the data processor is also shown in FIG. 1 together with the data processor. The instruction code 3 is composed of two portions, i.e. an op code (operating code) portion for designating either one of operations for saving contents of the register 1 to the stack memory 2 (this operation will hereinafter be referred to as the push operation or simply as PUSH) or for restoration of the information to the register 1 from the stack memory 2 (hereinafter this operation will be referred to as the pop operation or simply as POP) and a portion for designating the register for which neither the PUSH nor the POP is to be performed. (This portion includes a four-bit field corresponding to the four registers in the case of the illustrated embodiment.)

An op code decoder constituting a part of the instruction decoder 4 decodes the op code to thereby generate a PUSH signal 5 or a POP signal 6 for controlling the stack memories associated with the individual registers.

Figure 5:
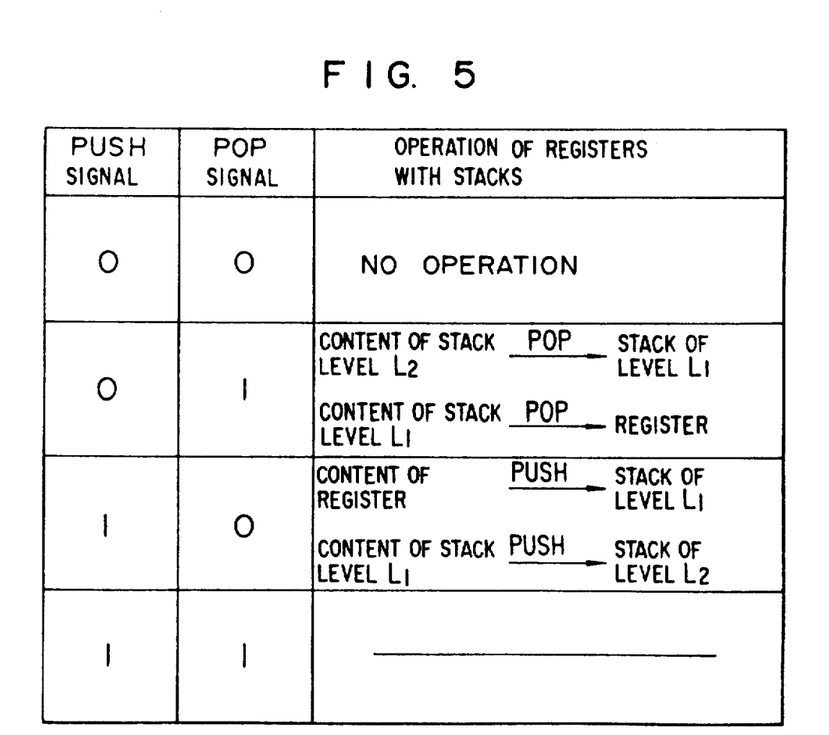
FIG. 5 is a view showing the conditions for allowing push and pop operations of the data processor shown in FIG. 1.

The PUSH signal 5 and the POP signal 6 may assume such combinations of values as illustrated in FIG. 5. More specifically, referring to this figure, when the value of the PUSH signal 5 is "0" with that of the POP signal 6 being "0", this means that neither the push operation (PUSH) nor the pop operation (POP) is to be performed on the contents of the registers 1, as indicated by "NO OPERATION". When the push signal 5 is "1" with the POP signal 6 being "0", the content of the register 1 is to be pushed on the stack memory 2. When the PUSH signal 5 is "0" with the POP signal 6 being "1", this indicates that the content of the stack memory 2 is to be popped to the register 1. The value combination of the PUSH signal 5 of "1" with the POP signal 6 of "1" is inhibited.

In the case of the instruction code 3 exemplified in FIG. 1, since the bit corresponding to the register b in the four-bit field on the instruction code 3 is set to "1", both the PUSH signal 5 and the POP signal 6 for the register b assume "0". Accordingly, for the register b, neither the PUSH operation nor the POP operation is performed. On the other hand, the bits corresponding to the three registers a, c and d in the four-bit field of the instruction code 3 are set to "0s", respectively. Accordingly, the PUSH signal 5 and the POP signal 6 reflect the content of the op code as it is. More specifically, when the PUSH operation is designated by the op code, the PUSH signal 5 assumes "1" with the POP signal 6 being "0", while when the POP operation is designated by the op code, the PUSH signal 5 assumes "0" with the POP signal 6 assuming the value "1". Consequently, in the case of the example illustrated in FIG. 1, the PUSH operation or POP operation is performed simultaneously on the three registers a, c and d except for the register b in accordance with the content of the op code.

Next, referring to FIG. 2, description will be made of how the contents of the four registers 1 and the associated stack memories 2 are changed when the PUSH and POP operations are performed successively by the data processor of the structure shown in FIG. 1.

Figure 2:
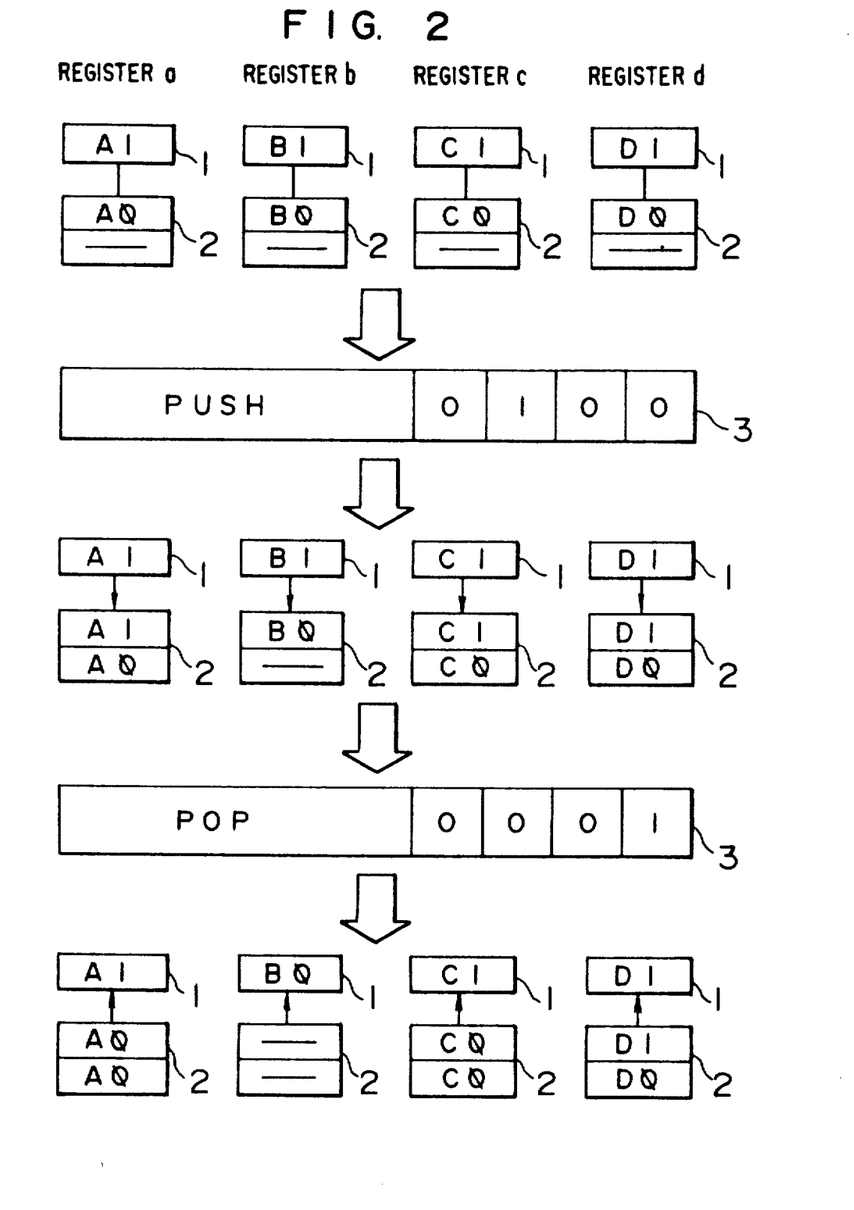
FIG. 2 is a view for illustrating basic operations of the data processor shown in FIG. 1.

In FIG. 2, the initial values of the four registers and the associated stack memories 2 are such that A1 is placed in the register a, B1 is placed in the register b, C1 is placed in the register c and D1 is placed in the register d while A0 is placed in the top stack (level $L_1$) of the stack memory 2 associated with the register a, B0 is placed in the top stack (level $L_1$) of the stack memory 2 associated with the register b, C0 is placed in the top stack (level $L_1$) of the stack memory 2 associated with the register c and D0 is placed in the top stack (level $L_1$) of the stack memory 2 associated with the register d, respectively. Parenthetically, horizontal lines drawn in the stack memories 2 at the depth of level $L_2$ in FIG. 2 indicate indefinite values.

When the PUSH instruction is issued starting from the state shown in FIG. 2, the push operation is performed simultaneously for all the three registers a, c and d except for the register b because the latter is designated as the one for which no push operation is to be performed with this instruction. Thus, the contents A1, C1 and D1 of the registers a, c and d are pushed into the tops (first level stacks) of the associated stack memories, respectively. At the same time, the contents A0, C0 and D0 placed in the top or first stacks (level $L_1$) of the stack memories associated with the registers a, c and d, respectively, are simultaneously pushed into the respective deeper stacks (of level $L_2$) More specifically, as regards the register a, the content A1 thereof is pushed into the top stack (level $L_1$) of the associated stack memory and at the same time the content A0 placed in the top stack (level $L_1$) of the associated stack memory is pushed into the deeper stack (of level $L_2$).

On the other hand, assuming that the POP instruction is issued starting from the state shown in FIG. 2, then the contents of the stack memories 2 are popped simultaneously to the registers a, b and c except for the register d designated as the register for which the POP operation is not to be performed with this instruction. Thus, the contents of the top stacks (of level $L_1$) are popped to the associated registers a, b and c, respectively. At the same time, the contents placed in the stacks of level $L_2$ of the stack memories 2 are popped to the top stacks (of level $L_1$), respectively. More specifically, as regards the register a, for example, the content A1 of the top stack (level $L_1$) of the stack memory 2 associated with the register a is popped to the latter. Simultaneously with this, the content A0 placed in the stack of level $L_2$ of this stack memory 2 is popped to the top stack (of level $L_1$) thereof.

Figure 3:
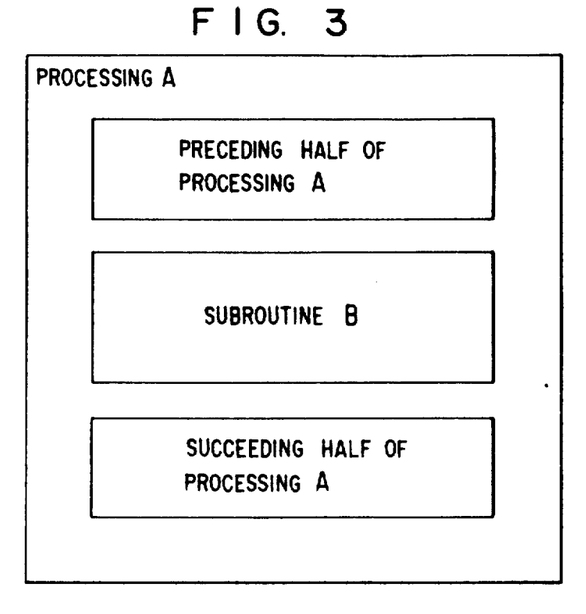
FIG. 3 is a diagram showing a structure of a program including a subroutine to be executed by the data processor shown in FIG. 1.

Now, description will be turned to the procedure of executing a program including a subroutine by the data processor having the registers equipped with the respective stack memories 2 in the structure described above by reference to FIG. 1. In this conjunction, it is assumed that the program of concern has such a block structure as shown in FIG. 3, in which a program termed as processing A is separated into a preceding half and a succeeding half between which a subroutine B is sandwiched or interposed.

Figure 4:
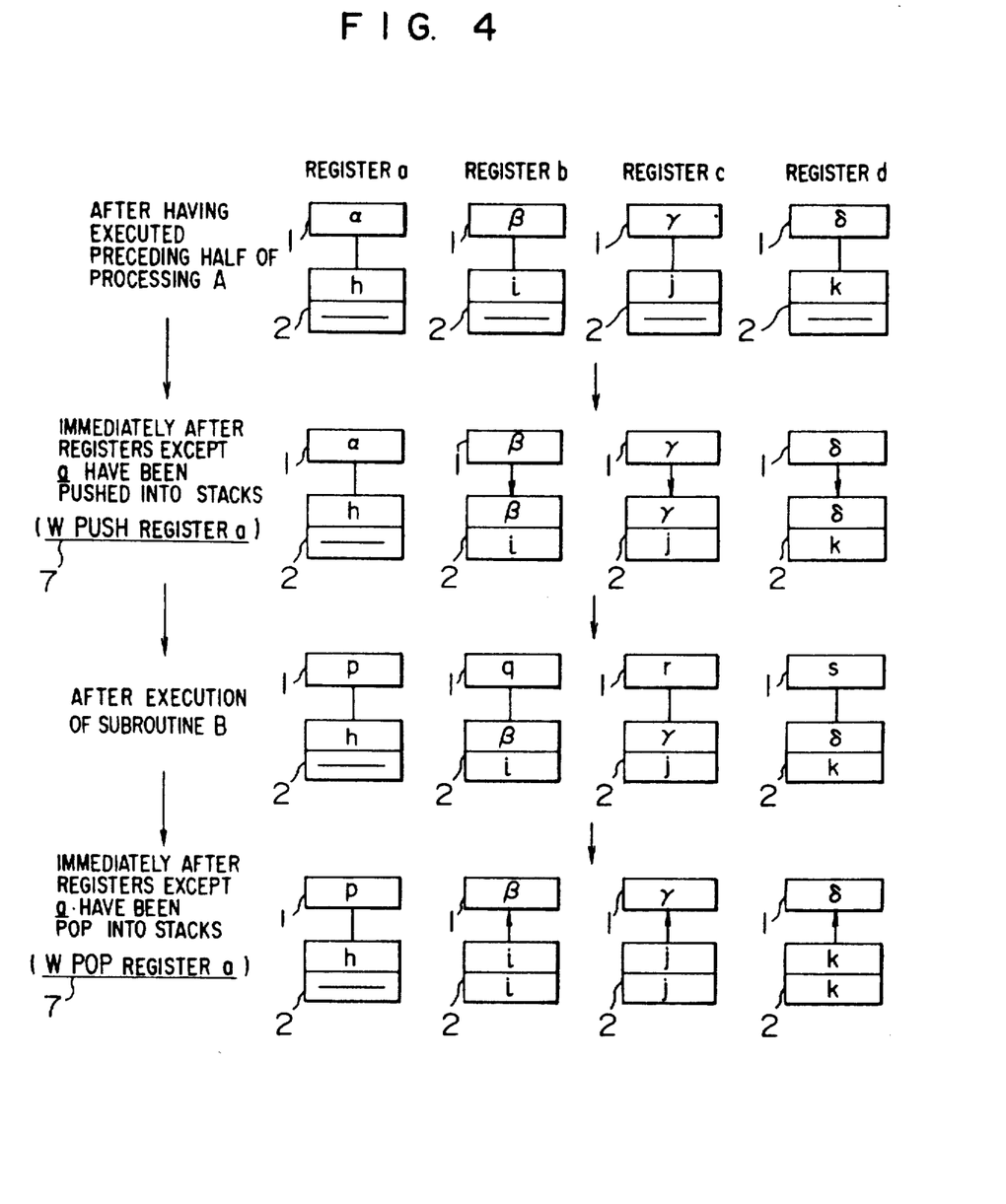
FIG. 4 is a view for illustrating changes in the contents in registers and stack memories brought about by executing a program of the structure shown in FIG. 3 by the data processor shown in FIG. 1.

FIG. 4 shows changes in the contents of the registers and the stack memories brought about by execution of this program, when viewed macroscopically. More specifically, there are illustrated in FIG. 4 the contents of the registers 1 and the stack memories 2 at four discrete time points after the execution of the preceding half of the processing A and immediately before the execution of the succeeding half of the processing A. In FIG. 4, reference numeral 7 designates assembler mnemonics for the stack control instruction executed. In this connection, "WPUSH/WPOP" is an abbreviation of "WITHOUT PUSH/POP" and represents an op code indicating that the operands are to be pushed or popped except for the succeeding operand (the register a in the case of the instant embodiment).

Now, description will be made with reference to the four discrete time points mentioned above. Incidentally, it is to be noted that in the case of the example illustrated in FIG. 4, neither PUSH nor POP operation is performed on the register a which is destined for use in the data transfer between the processing A and the subroutine B.

It is assumed that at the first time point when the preceding half of the processing A has been executed, the values of the four registers a, b, c and d are $\alpha$, $\beta$, $\gamma$ and $\delta$, respectively. The value $\alpha$ of the register a is a reference value or argument to be transferred to the subroutine B. It is further assumed that the top stacks of the four stack memories 2 associated with the four registers a, b, c, and d, respectively, contain values h, i, j and k, respectively, and that the conents of the other stacks are all indefinite. The indefiniteness is represented by horizontal lines as mentioned hereinbefore.

The second time point comes immediately after the push operation has been performed for the three registers b, c and d except for the register a. The values $\alpha$, $\beta$, $\gamma$, and $\delta$ of the registers a to d and the contents h of the stack memory 2 associated with the register a remain invariable, while the top stacks of the stack memories 2 associated with the registers b to $d$ have been loaded with the same values as those $\beta$, $\gamma$ and $\delta$ of these registers b to d, respectively, and the contents i, j and k placed in the top stacks (level $L_1$) of these three stack memories 2 have been moved to the respective deeper stacks of level $L_2$.

The third time point lies immediately after the subroutine b has been executed. Assuming that the subroutine B has been executed for the processing for which all of the four registers are used, it is shown that the values of the four registers a, b, c and d have been changed to values p, q, r and s, respectively. The value p of the register a results from the processing by the subroutine B and is to be transferred to the succeeding half of the processing A. Also at this time point, there are saved in the stack memories associated with the register b to d, respectively, the value i, j and k of these registers immediately after the execution of the preceding half of the processing A and the values $\beta$, $\gamma$ and $\delta$ stored in the stacks of depth level $L_1$.

Finally, the fourth time point lies immediately before execution of the succeeding half of the processing A and immediately after the POP has been performed for the three registers b, c and d except for the register a from the associated stack memories 2. At this time point, the values of the four registers a, b, c and d are p, $\beta$, $\gamma$ and $\delta$, respectively. Further, the values of the top stacks (level $L_1$) of the stack memories 2 associated with the registers a, b, c and d are h, i, j, and k, respectively, which are the values at the time point immediately after execution of the preceding half of the processing A. In other words, when viewed from the side of the processing A, the subroutine B has received the reference value $\alpha$ through the register a and thereafter returned the result p of the processing without exerting any influence to the contents of the other three registers and those in the top stacks of the four stack memories 2.

As will be understood from the above description, it is achieved according to the teaching of the invention that when a program including a subroutine is executed by the data processor having a number of registers, influence of the subroutine for rewriting the values of registers which would otherwise be exerted to the main routine can be evaded. In this conjunction, it is noted that since the saving or restoration to or from the registers can be completed within one instruction execution cycle, attendant overhead can always remain constant regardless of the number of the registers. Thus, execution of a program in which subroutines are employed many times can be carried out at high speed regardless of the number of the registers incorporated in the data processor to a great advantage. Further, when the instruction "WPUSH/WPOP" illustrated in FIG. 4 is used, it is sufficient to designate only one of the four registers for which the saving is not to be performed, instead of designating the three registers to be saved, which in turn means that the number of the operands for the description can be decreased to one third to further advantage. In general, in the data processor including N registers (N is a positive integer), it can be said that when no more than one register is used for the transfer of the reference value (argument), the amount of description for the operand can be significantly reduced down to 1/(N−1), as a result of which the program can be extremely simplified to significantly advantageous effect.

It goes without saying that the present invention is never limited to the illustrated embodiment described above but various modifications and versions may be made to without departing from the scope and spirit of the invention.

By way of example, the number of the registers 1 is never limited to four but can be increased to eight (8), sixteen (16), or thirty-two (32). In that case, the number of the data saving stack memories 2 is also increased correspondingly to 8, 16 or 32.

Of course, the number of the data saving stacks or levels can be increased to more than two.

It should further be mentioned that the present invention is not restricted to the microcomputer or microprocessor but can equally be applied to a digital signal processor for processing digital signal data obtained through an analog-to-digital (A/D) conversion of analog sound data or analog video data.

As will now be appreciated from the foregoing description, in the data processor according to the present invention, the contents of all the registers can be saved simultaneously because the registers have the dedicated data saving stack memories, respectively. Thus, even in the case of a data processor incorporating a great number of registers, the contents of all the registers can be saved and restored at a high speed within a constant time regardless of the number of the registers according to the teachings of the invention.

Further, in the case of the data processor according to the illustrative embodiment of the present invention, the instruction code has a field for controlling directly the operation of the stack memories provided in association with the individual registers, respectively. According to this feature, it is also possible to designate only the particular register whose content is not to be saved or restored. Due to this function, transfer of reference values (arguments) between the main routine and the subroutine can be realized with an enhanced efficiency.

Besides, since the data processor according to the illustrated embodiment of the invention makes use of such assembler mnemonic that the register for which the stack operation is not to be performed is designated, simplified program description having an improved understandability is possible even in the data processor having a large number of registers.

What is claimed is:

1. A data processor having a plurality of internal general purpose registers, and an apparatus for simultaneously saving the contents of selected ones of the plurality of general purpose registers during a program interruption process or during a subroutine call process, the apparatus comprising:

a plurality of coupling line means, each connected to a one of the plurality of general purpose registers of the data processor, for transferring data from the plurality of internal general purpose registers;

instruction decoder means for decoding a PUSH instruction code executable by said data processing and generating a plurality of PUSH command signals on a plurality of PUSH command signal lines responsive to the decoded PUSH instruction; and, a plurality of stack memory means operatively associated with said plurality of PUSH command signal lines and each connected to a single one of the plurality of general purpose registers through a single one of the plurality of coupling line means, for simultaneously storing the contents of selected ones of the plurality of general purpose registers according to said plurality of PUSH command signals.

2. The apparatus according to claim 1 wherein:

said plurality of coupling line means include means for transferring data to the plurality of internal general purpose registers;

said instruction decoder means includes means for decoding a POP instruction code executable by said data processor and generating a plurality of POP command signals on a plurality of POP command signal lines responsive to the decoded POP instruction; and, said plurality of stack memory means are operatively associated with said plurality of POP command signal lines and include means for simultaneously selectively writing ones of their respective contents to the plurality of general purpose registers according to said plurality of POP command signals.

3. The apparatus according to claim 2 wherein said instruction decoder means includes means for generating said plurality of POP command signals on selected ones of said plurality of POP command signal lines according to the decoded POP instruction.

4. The apparatus according to claim 3 wherein said instruction decoder means includes:

opcode detector means for decoding an opcode portion of said POP instruction code and generating a first logic signal on a first logic signal line; and, logic circuit means coupled to said first logic signal line and to said plurality of POP command signal lines for decoding a first pattern in a second portion of said POP instruction code responsive to said first logic signal and generating said plurality of POP command signals on said plurality of POP command signal lines according to said pattern.

5. The apparatus according to claim 1 wherein said instruction decoder means includes means for generating said plurality of PUSH command signals on selected ones of said plurality of PUSH command signal lines according to the decoded PUSH instruction.

6. The apparatus according to claim 5 wherein said instruction decoder means includes:

opcode detector means for decoding an opcode portion of said PUSH instruction code and generating a first logic signal on a first logic signal line; and, a logic circuit means coupled to said first logic signal line and to said plurality of PUSH command signal lines for decoding a first pattern in a second portion of said PUSH instruction code responsive to said first logic signal and generating said plurality of PUSH command signals on said plurality of PUSH command signal lines according to said pattern.

7. The apparatus according to claim 6 wherein:

said plurality of coupling line means include means for transferring data to the plurality of internal general purpose registers;

said instruction decoder means includes means for decoding a POP instruction code executable by said data processor and generating a plurality of POP command signals on a plurality of POP command signal lines responsive to the decoded POP instruction; and, said plurality of stack memory means are operatively associated with said plurality of POP command signal lines and include means for simultaneously selectively writing ones of their respective contents to the plurality of general purpose registers according to said plurality of POP command signals.

8. The apparatus according to claim 7 wherein said instruction decoder means includes means for generating said plurality of POP command signals on selected ones of said plurality of POP command signal lines according to the decoded POP instruction.

9. The apparatus according to claim 8 wherein:

said opcode detector means includes means for decoding an opcode portion of said POP instruction code and generating a second logic signal on a second logic signal line; and, said logic circuit means includes:
means for connecting to said second logic signal line and to said plurality of POP command signal lines; and,
means for decoding a second pattern in a second portion of said POP instruction code responsive to said second logic signal and generating said plurality of POP command signals on said plurality of POP command signal lines according to said pattern.

10. A data processor having a plurality of internal general purpose registers, and an apparatus for simultaneously saving the contents of first selected ones of the plurality of general purpose registers during a program interruption process or during a subroutine call process and simultaneously retrieving the contents saved into second selected ones of the plurality of general purpose registers during a program return process or during a subroutine return process, the apparatus comprising:

a plurality of coupling line means, each connected to a one of the plurality of general purpose registers of the data processor, for transferring data to and from the plurality of internal general purpose registers;

instruction decoder means for decoding a PUSH instruction code executable by said data processor and generating a plurality of PUSH command signals on a plurality of PUSH command signal lines responsive to the decoded PUSH instruction and decoding a POP instruction code executable by said data processor and generating a plurality of POP command signals on a plurality of POP command signal lines responsive to the decoded POP instruction; and, a plurality of stack memory means operatively associated with said plurality of PUSH command signal lines and said plurality of POP command signal lines, each connected to a single one of the plurality of general purpose registers through a single one of the plurality of coupling line means, for simultaneously storing the contents from the first selected ones of the plurality of general purpose registers according to said plurality of PUSH command signals and simultaneously writing the contents of the plurality of stack memory means to the second selected ones of the plurality of general purpose registers according to said plurality of POP command signals.

11. The apparatus according to claim 10 wherein said instruction decoder means includes means for generating said plurality of PUSH command signals on first selected ones of said plurality of PUSH command signal lines according to the decoded PUSH instruction and generating said plurality of POP command signals on second selected ones of said plurality of POP command signal lines according to the decoded POP instruction.

12. The apparatus according to claim 11 wherein said instruction decoder means includes:

opcode detector means for decoding an opcode portion of said PUSH and POP instruction codes and generating a first logic signal on a first logic signal line and a second logic signal on a second logic signal line respectively; and, a logic circuit means coupled to said first and second logic signal lines and to said plurality of PUSH and POP command signal lines for decoding a first pattern in a second portion of said PUSH instruction code responsive to said first logic signal and generating said plurality of PUSH command signals on said plurality of PUSH command signal lines according to said first pattern and decoding a second pattern in a second portion of said POP instruction code responsive to said second logic signal and generating said plurality of POP command signals on said plurality of POP command signal lines according to said second pattern.

* * * * *

UNITED STATES PATENT AND TRADEMARK OFFICE
CERTIFICATE OF CORRECTION

PATENT NO. : 5,241,679
DATED : August 31, 1993
INVENTOR(S) : Tetsuya Nakagawa, et al.

It is certified that error appears in the above-identified patent and that said Letters Patent is hereby corrected as shown below:

Claim 1, column 8, line 2, delete "processing" and substitute therefor --processor--.

Signed and Sealed this

Eighth Day of March, 1994

Attest:

BRUCE LEHMAN

Attesting Officer
Commissioner of Patents and Trademarks